United States Patent [19]
Hayes

[11] Patent Number: 5,413,308
[45] Date of Patent: May 9, 1995

[54] FAIL-OPEN SOLENOID ACTUATED VALVE

[75] Inventor: William R. Hayes, Cincinnati, Ohio

[73] Assignee: The Horton Company, Pittsburgh, Pa.

[21] Appl. No.: 115,871

[22] Filed: Sep. 3, 1993

[51] Int. Cl.⁶ .................. F16K 25/00; F16K 31/02
[52] U.S. Cl. .................................. 251/77; 251/86; 251/129.02
[58] Field of Search .................. 251/86, 77, 129.02

[56] References Cited

U.S. PATENT DOCUMENTS

| | | |
|---|---|---|
| 2,735,047 | 2/1956 | Garner et al. ............ 251/86 X |
| 3,078,874 | 2/1963 | Kolze . |
| 3,720,858 | 3/1973 | Mercier . |
| 3,750,693 | 8/1973 | Hardison . |
| 4,206,900 | 6/1980 | Willis . |
| 4,249,883 | 2/1981 | Woolfolk . |
| 4,285,493 | 8/1981 | Willis . |
| 4,533,114 | 8/1985 | Cory et al. . |
| 4,606,718 | 8/1986 | Kendall-Tobias . |
| 4,715,852 | 12/1987 | Reinicke et al. . |
| 4,733,697 | 3/1988 | Baun . |
| 4,759,255 | 7/1988 | Shimamura ............ 251/129.02 X |

*Primary Examiner*—John Rivell
*Attorney, Agent, or Firm*—Sixbey, Friedman, Leedom & Fergusion

[57] ABSTRACT

A spring biased normally open solenoid actuated valve includes a valve body having a valve seat defining a valve port, located between an inlet port and an outlet port, that is controlled by a spool. When the solenoid is de-energized, the valve spool is biased open by a compression spring. The valve spool may include a double seal assembly expanding the range of operating pressures for a given spring force. The double seal assembly includes a rod having first and second ends with the first end secured to a stem of the spool. A retainer including a first sealing surface is secured to the second end of the rod. A sealing member, longitudinally moveable along the rod, is concentrically located on the rod adjacent the retainer and includes an inner valve seat and a second sealing surface such that the first sealing surface contacts the inner valve seat and the second sealing surface contacts the valve port when the solenoid is energized thus closing the valve. When the solenoid is deactivated intentionally or due to an electrical failure the valve fails to an open position. The valve spool may include a sleeve secured about the rod, positioned adjacent the sealing member so that when the valve stem is moved from a sealing position to an open position, the sleeve contacts the sealing member after movement of the stem has commenced.

19 Claims, 3 Drawing Sheets

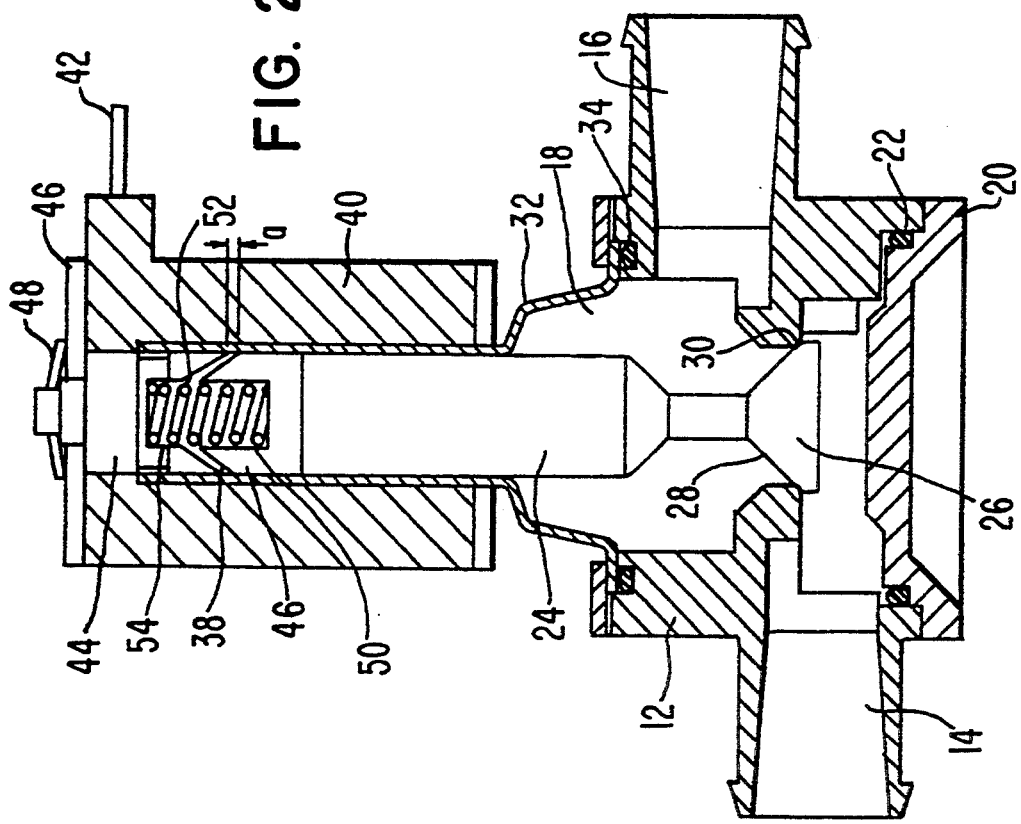
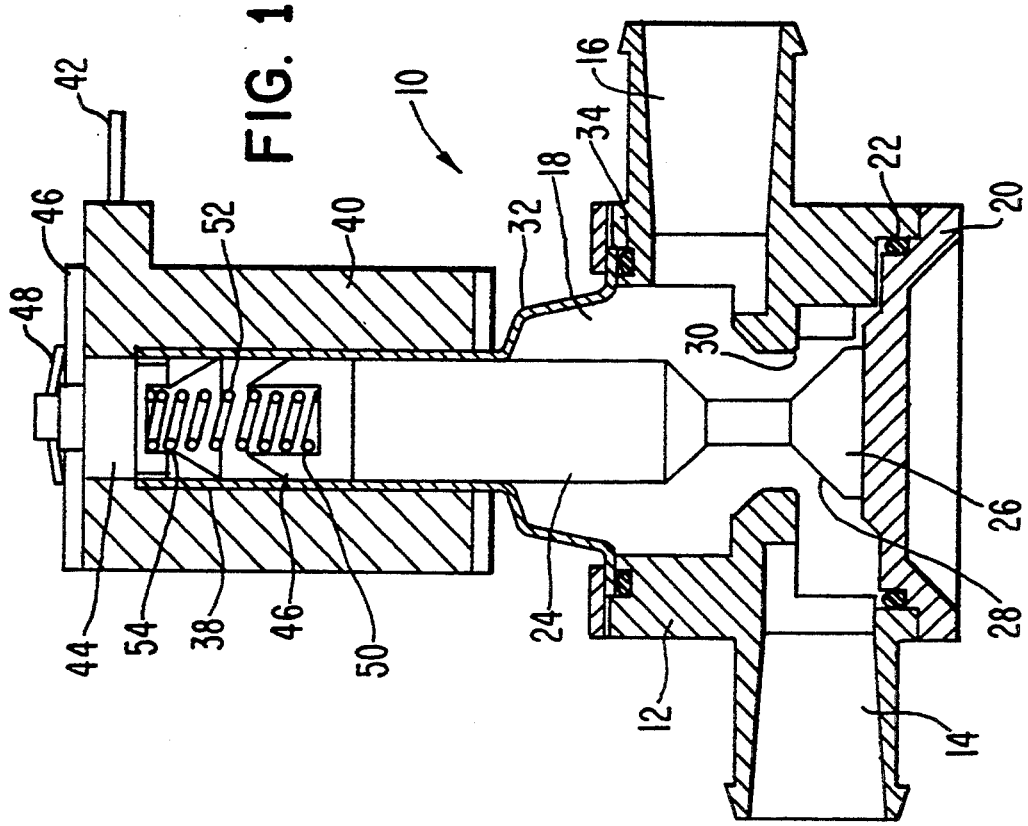

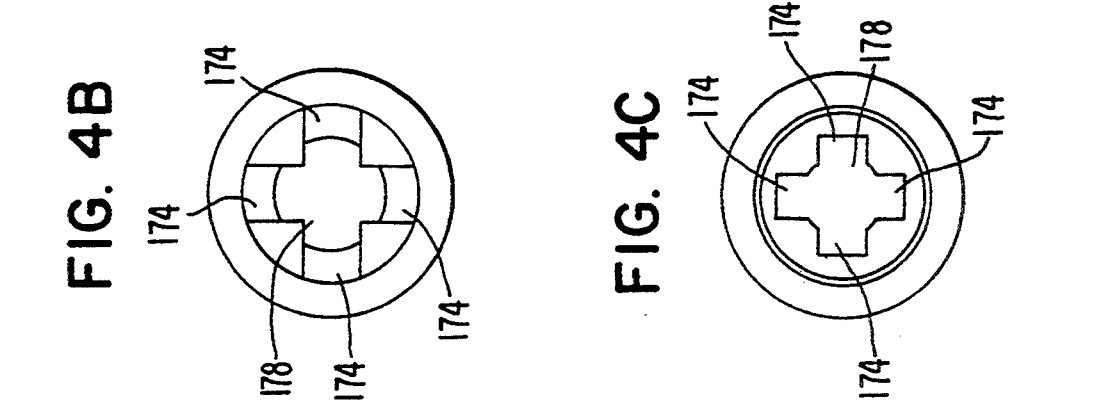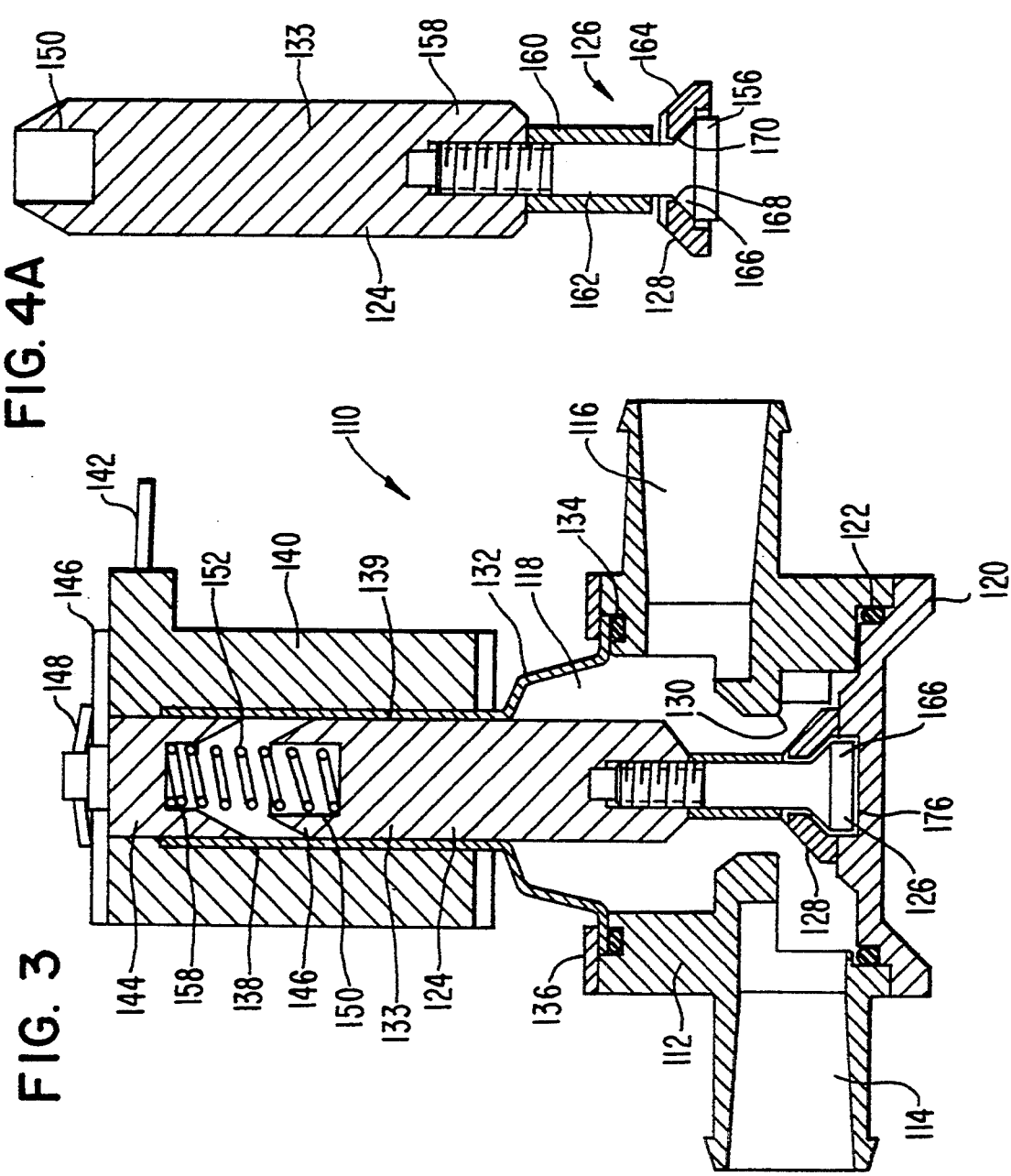

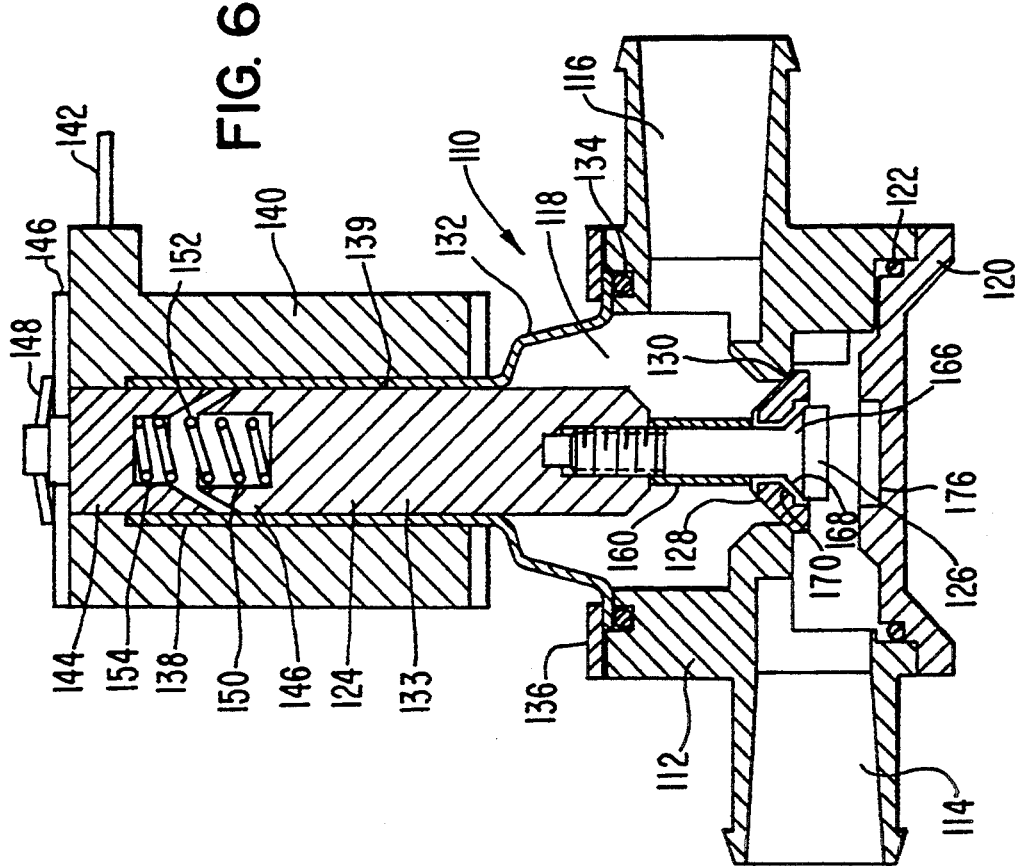
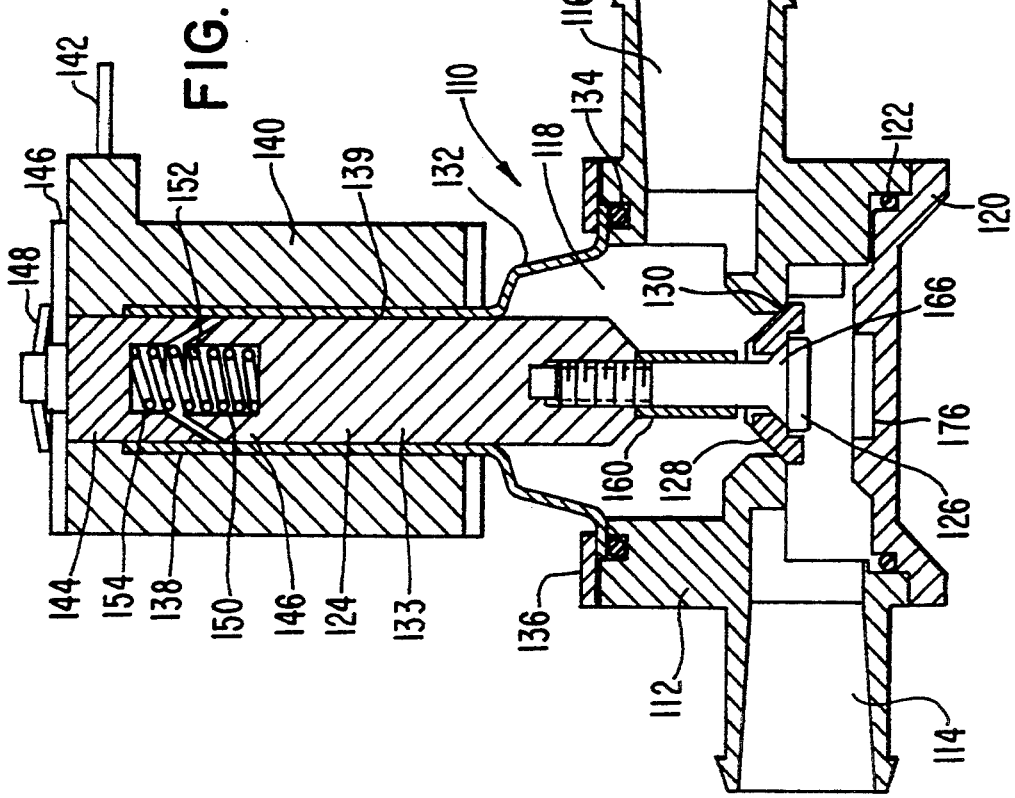

FAIL-OPEN SOLENOID ACTUATED VALVE

FIELD OF THE INVENTION

The subject invention relates to solenoid-actuated valves and more particularly, solenoid-actuated valves where the valve is in the open condition when de-energized.

BACKGROUND OF THE INVENTION

Many types of solenoid valves are known in the prior art, particularly solenoid-actuated valves which fail in the closed condition. That is, when power to these valves is interrupted, the biasing means, which is usually a compression spring, forces an armature of the valve to move against a generally soft elastomeric sealing member such as a diaphragm or the like, in order to close the valve. While this configuration is highly beneficial in in many instances where serious leakage needs to be prevented, such as in a washing machine or an ice-maker, in some instances such a closed condition could be disastrous. That is, in some types of devices, providing a seal for an extended period of time could cause serious damage to the device as well as the environment surrounding the device.

A number of the above noted valves incorporate a diaphragm within a housing for providing a seal between an inlet and an outlet. With such valves, each stroke of the valve causes the diaphragm to be exercised which stresses the diaphragm. Over time, the continued exercising of the diaphragm will cause the diaphragm to rupture and fail. Also, oftentimes sediments in the fluid passing through the valve will collect on the diaphragm and hinder its proper operation.

U.S. Pat. No. 3,750,693 issued to Hardison discloses a valve for admitting ram air to an airplane fuel system. A popper element surrounds a stationary coil such that when the solenoid is energized, the poppet moves down to a closed position to close the valve and when the solenoid is de-energized, a spring moves the poppet to open the valve. However, this valve utilizes a balanced design such that pressures above and below the poppet are equalized. Moreover, the pressure within an inlet of the valve does not assist in maintaining the valve in the closed position, it is only the solenoid which maintains the valve closed. Further, in order for the valve to properly seal, a soft elastomeric seal is required, which over time will wear and become ineffective in sealing the valve when in the closed position. Also, it can be noted that the solenoid windings are subjected to the fluid medium passing through the valve. Consequently this valve would be ineffective in a system for handling liquids.

In an effort to overcome the above noted shortcomings, U.S. Pat. No. 4,733,697 issued to Baun discloses a system including a solenoid actuated pilot valve which utilizes a system pressure to open a primary valve. In the event that power to the solenoid of the pilot valve is interrupted, the primary valve will remain open assuring a flow of cooling water to rollers of a rolling mill. However, the pilot valve itself is a three-way valve and permits fluid flow when in the energized or de-energized condition albeit to two different flow paths.

Accordingly, there is a need in the marketplace for a solenoid actuated valve which will close only when an electrical signal is provided to the solenoid and will be normally open when the solenoid is de-energized either as part of the normal operation of the valve or as a result of an electrical failure in the system. Moreover, there is a need for a solenoid valve that would open under a broad range of input pressures, thereby permitting the valve to be utilized in a system where a variety of fluid pressures are passed through the valve or to enable a valve of lesser magnitude; that is, one having a smaller solenoid and weaker biasing means, thus reducing the overall cost of the valve.

SUMMARY OF INVENTION

A primary object of the present invention is to overcome the above-noted shortcomings associated with prior solenoid-actuated valves.

A further object of the present invention is to provide a solenoid valve which will confidently fail in an open and safe condition thereby permitting continuous flow of fluid through the valve in the event of an electrical failure.

Another object of the present invention is to provide a solenoid operated valve which is capable of functioning over a wide range of fluid pressures.

Yet another object of the present invention is to provide a solenoid actuated valve which may be manufactured at a cost less than that required for valves in systems handling the same fluid pressures.

These as well as additional advantages of the present invention are achieved by providing a normally open solenoid actuated valve including a valve body having a valve seat defining a valve port therein. The valve port is located between an inlet port and an outlet port and is sealed by a valve spool that is controlled by a solenoid. When the solenoid is de-energized, the valve spool is biased in an open position by a compression spring. The valve spool may include a double seal assembly for expanding the range of operating pressures for a given spring force. The double seal assembly includes a rod having first and second ends with the first end being secured to a stem of the valve spool, a retainer secured to the second end of the rod with the retainer including a first sealing surface. In a preferred embodiment of the present invention, a sealing member is concentrically located on the rod adjacent the retainer with the sealing member being longitudinally moveable along the rod and includes an inner valve seat and a second sealing surface such that the first sealing surface contacts the inner valve seat and the second sealing surface contacts the valve port when the solenoid is energized thus sealing off fluid communication between the inlet section and the outlet section, with the valve failing in an open condition when the solenoid is deactivated intentionally or due to an electrical failure. The valve spool may also include a sleeve secured about the rod and positioned adjacent the sealing member so that when said valve stem is moved from a sealing position to an open position, the sleeve contacts the sealing member after movement of said valve stem is commenced.

Additional objects and advantages of the present invention will become apparent from the following detailed description of the present invention when read in light of the several figures.

BRIEF DESCRIPTION OF THE DRAWINGS

FIG. 1 is a cross-sectional view of a solenoid actuated valve formed in accordance with the present invention with the valve illustrated in the de-energized and opened condition.

FIG. 2 is a cross-sectional view of a solenoid actuated valve illustrated in FIG. 1 with the valve in the energized and closed position.

FIG. 3 is a cross-sectional view of a solenoid actuated valve in accordance with a preferred embodiment of the present invention, the valve being illustrated in the de-energized and opened condition.

FIG. 4A is an expanded view of the armature and sealing member of the solenoid actuated valve illustrated in FIG. 3.

FIG. 4B is a top view of the sealing member of FIG. 4A.

FIG. 4C is a bottom view of the sealing member of FIG. 4A.

FIG. 5 is a cross-sectional view of a solenoid actuated valve illustrated in FIG. 3 in the energized and closed position.

FIG. 6 is a cross-sectional view of a solenoid actuated valve illustrated in FIGS. 3 and 5 in the initial phase of de-energization of the solenoid.

DETAILED DESCRIPTION OF THE INVENTION

Referring initially to FIGS. 1 and 2, a solenoid actuated valve 10 in accordance with the present invention is illustrated. The solenoid actuated valve 10 includes a body 12 including an inlet port 14 and outlet port 16 integrally formed therein. The body 12 includes an open cavity 18 which communicates with both the inlet and outlet ports. A lowermost end of the body 12 is closed by closure 20 which sealingly engages the body 12 by way of sealing gasket 22. The gasket 22 may be in the form of a rubber O-ring or any other conventional type seal. Reciprocally received within the cavity 18 is an elongated armature 24 which is made of a magnetic material and which includes a sealing member 26. The sealing member 26 may be of the same material as the armature 24 if a one piece construction is used or of a different material such as stainless steel or plastic if a multipiece construction is desired. The sealing member 26 includes a sealing surface 28 which cooperates with valve seat 30 formed in the body 12 in order to form a fluid tight seal thereby interrupting fluid communication between the inlet port 14 and the outlet port 16. Sealingly secured to an upper portion of the body 12 is an armature guide 32, which supports the armature 24 and provides proper alignment as the armature moves between a fully open position and a fully closed position. The armature guide 32 is formed of a metallic material and preferably 90-10 bronze; however, any suitable material may be used depending upon the particular application of the valve. As with the closure 20, a gasket in the form of an O-ring 34 is provided between the armature guide 32 and the body 12 in order to form the seal therebetween. Top plate 36 is secured to the body 12 in order to maintain the armature guide 32 in the position illustrated in FIG. 1. An upper end 38 of the armature guide 32 is received within a central bore 39 of a solenoid 40 which includes electrical leads 42 extending therefrom for selectively energizing an electrical coil of the solenoid 40. Also, secured to the upper end 38 of the armature guide 32 is a receiver 44 made of a magnetic material for receiving the tipper end 46 of the armature 24. The receiver 44 which is secured to the upper end 38 of the armature guide 32 is secured to a mounting bracket 46 housing the solenoid 40 by way of a locking nut 48.

As can be seen from FIG. 1, the upper end 46 of the armature 24 includes a central bore 50 receiving a lower portion of a compression spring 52 therein. Similarly, the receiver includes a central bore 54 for receiving an upper portion of the compression spring 52. The compression spring 52 acts to bias the valve portion 26 of the elongated armature 24 into contact with the closure 20 thereby permitting fluid communication between the inlet port 14 and the outlet port 16. The compression strength of the compression spring 52 must be selected so as to be capable of overcoming the fluid pressure forces exerted on the valve portion 26 when the valve is in the closed position. Similarly, the strength of the solenoid 40 must be such that it is capable of overcoming the compression strength of the spring 52. Accordingly, the requisite strengths of each of the solenoid 40 and the compression spring 26 must be selected in accordance with the system in which the valve is to be employed. While the several figures illustrate a compression spring as that means for biasing the armature 24 into the open position, any means for biasing the armature may be employed in order to provide a fail open solenoid actuated valve.

Referring now to FIG. 2, the solenoid actuated valve 10 is illustrated in the energized and closed position wherein the fluid flow from inlet port 14 to the outlet port 16 is interrupted. As can be seen from FIG. 2, the armature 24 is retracted due to the energization of the solenoid 40 and movement of the armature 24 against the force of the compression spring 52. In order to assure that the valve portion 26 of the armature 24 properly seats in the valve seat 30, the spacing between the upper end of the armature 24 and the receiver 44 must be greater than the distance between the closure 20 and the valve seat 30. Accordingly, a distance "a" remains between the upper end of the elongated armature 24 and the receiver 44 when the armature 24 is in the fully retracted position. As is further illustrated in FIG. 2, the armature 24 is effectively guided by the armature guide 32 in order to properly position the valve portion 26 within the valve seat 30 formed in the body 12.

Once fluid flow from the inlet port 14 to the outlet port 16 is desired, the solenoid 40 is de-energized such that the elongated armature 24 is displaced by the compression spring 52 and returned to the position illustrated in FIG. 1. Accordingly, as is readily apparent from the displacement of the elongated armature 24, should the solenoid 40 fail to be energized, the elongated armature 24 and thus the valve portion 26 will remain in the position shown in FIG. 1 and consequently continuous fluid communication between the inlet port 14 and the outlet port 16 is maintained. As is discussed hereinabove, such continued fluid communication between the inlet port 14 and the outlet port 16 is essential to the fail safe operation of many devices.

As discussed hereinabove, with the embodiment illustrated in FIGS. 1 and 2, the strength of the solenoid 40 must be greater than the compression force of compression spring 52 in order to overcome such force to move the elongated armature 24 from the position illustrated in FIG. 1 to that illustrated in FIG. 2. Further, the compression force of the spring 52 must be greater than the force exerted by fluid pressure on the effective surface area of the valve portion 26 of the armature 24 in order to displace the armature 24 once the solenoid 40 is de-energized. As can be readily appreciated by the illustrated embodiment, the pressure force within the inlet port 14 will aid in maintaining the valve portion 26 and consequently the sealing surface 28 in sealing contact with the valve seat 30. In doing so, a substantially fluid type seal can be maintained therebetween.

Referring now to FIGS. 3–6, an alternative and preferred embodiment to that previously discussed will be described in greater detail. As with the solenoid actuated valve 10 illustrated in FIG. 1, the solenoid actuated valve 110 of FIG. 3 includes a body 112 having an inlet port 114 and an outlet port 116 fluidically communicating with an inner cavity 118. A lower portion of the inner cavity 118 is sealed by a closure 120 which sealingly engages the body 112 by way of sealing gasket 122. Reciprocally received within the cavity 118 is an elongated armature 124. It is the elongated armature 124 which constitutes a significant change over that set forth in the embodiment of FIG. 1. As with the previous embodiment, the elongated armature 124 includes a valve portion 126 which includes a first sealing surface 128 which is sealingly received by the valve seat 130 formed in the body 112. The detailed configuration of the valve portion 126 will be described in greater detail with reference to FIG. 4A hereinbelow.

Similar to the previous embodiment, an armature guide 132 made of a metallic material and preferably 90-10 bronze; however, any suitable material may be used depending upon the particular application of the valve is provided for guiding the reciprocal movement of the elongated armature 124 and particularly receives a stem portion 133 of the armature 124 so as to assure proper alignment of the valve portion 126 within the valve seat 130. The stem portion 133 is of a magnetic material. Also, the armature guide 132 is sealingly attached to the body 112 by way of top plate 136 and sealing gasket 134. As discussed previously, the armature guide is formed of a rigid metallic material so as to assure unobstructed movement of the armature 124. An upper portion 138 of the armature guide 138 is received within a central bore 139 of an electromagnetic solenoid 140 which is selectively energized by way of leads 142.

A receiver 144 made of a magnetic material is provided within the central bore and secured to the upper portion 138 of the armature guide 132. The receiver 144 is configured so as to receive an upper end 146 of the elongated armature 124. The receiver 144 extends through a mounting bracket 147 and is secured thereto by way of a locking nut 148. A central bore 150 is provided in the upper end 146 of the elongated armature 124 and a central bore 154 is provided in the receiver 144 each respectively receiving an end of compression spring 152. This being substantially identical to that previously discussed with respect to FIG. 1. While the several figures illustrate a compression spring as that means for biasing the armature 124 into the open position, any means for biasing the armature may be employed in order to provide a fail open solenoid actuated valve.

Referring now to FIG. 4A, the valve portion 126 of the elongated armature 124 includes a retainer 156 threadingly secured to a main body portion 158 of the elongated armature 124. While the illustrated embodiment shows the retainer 156 being threadingly engaged with the main body portion 158, the retainer 156 may be secured to the main body portion 158 in any suitable manner so as to prevent relative movement between the respective members. Concentrically provided about the retainer 156 is a spacing sleeve 160 which in the preferred embodiment is fixedly secured to the retainer 156. It should be noted, however, that the spacing sleeve 160 may be secured to the main body portion 158 or may be permitted to slide along a shaft or rod 162 of the retainer 156. The flared end 166 and the rod 162 may be of a single or two-piece construction and made of stainless steel, plastic or other suitable material. Also, co-axially received about the retainer 156 is sealing member 164 which is somewhat loosely received about the shaft 162 so as to permit the sealing member 164 to be displaced from the flared end 166 of the retainer 156. The significance of which will be explained in greater detail hereinbelow. With the sealing member 164 which is preferably of a plastic material, a double seal is formed between the valve portion 126 of the elongated member 124 and the body 112. That is, the flared end 166 of the retainer 156 includes a sealing surface 168 which forms a seal between the flared end 166 of the retainer 156 and an inner valve seat 170 of the sealing member 164. Similarly, the sealing surface 128 forms a seal between the sealing member 164 and the valve seat 130 of the body 112.

Referring now to FIGS. 4B and 4C, the sealing member 164 includes diametrically opposed passages 174 which permit fluid to flow past the flared end 166 of the valve portion 126 when the sealing surface 168 and the inner valve seat 170 are spaced apart frown one another. The significance of these diametrically opposed passages will be explained in greater detail hereinbelow.

Referring now to FIGS. 3, 5 and 6, the operation of the solenoid actuated valve 110 will be explained in detail along with the particular significance of the valve portion 126. As is illustrated in FIG. 3, the valve 110 is in the de-energized and fully open condition. Therein, the compression spring 152 forces the elongated armature 124 into its lowermost position wherein the flared end 166 of the valve portion 126 is received within a concaved portion 176 of the closure 120. Further, the sealing member 164 is displaced to a position against the spacing sleeve 160. Therein, a continuous flow of fluid is permitted between the inlet port 114 and the outlet port 116.

When the solenoid 140 is energized, the elongated armature 124 is displaced in an upward direction against the force of compression spring 152 into the position illustrated in FIG. 5. When in this position, the sealing surface 168 of the flared end 166 sealingly engages the inner valve seat 170 of the sealing member 164 and the sealing surface 128 of the sealing member 164 sealingly engages the valve seat 130 formed in the body 112. As can be seen from FIG. 5, the spacing sleeve 160 is spaced from the sealing member 164 when in the closed and sealed position. As will be readily appreciated from the illustration, the fluid pressure of the fluid retained in the inlet port 114 will act to aid in maintaining the elongated member 124 in the retracted and sealing position.

Referring now to FIG. 6, when the solenoid 140 is initially de-energized, the force of compression spring 152 begins to displace the elongated armature 124 towards the closure 120 wherein the flared end 166 of the valve portion 126 is displaced from the inner valve seat 170 and the spacing sleeve 160 contacts an upper surface of the sealing member 164. As will be appreciated by those skilled in the art, because the diameter of the flared end 166 of the valve portion 126 is less than that of the valve portion 126 illustrated in the embodiment FIG. 1 and also less than that which is required to seal the larger opening at the valve seat 130, an effective surface area of the flared end is reduced and consequently the force required to displace the elongated armature 124 against the fluid pressure in the inlet port 114 may be reduced. Further, when the spacing sleeve 160 contacts the sealing member 164, the spacing sleeve 160 will be accelerating due to the displacement of the elongated armature 124 with respect to the sealing member 164 and consequently when the spacing sleeve 160 contacts the sealing member 164, it effectively dislodges or kicks the sealing member out of contact with the valve seat 130. In doing so, a compression spring 152 of a lesser spring constant may be used and ultimately a solenoid 140 of reduced size may be used. Accordingly, a solenoid valve 110 constructed in the manner illustrated in FIG. 3 may be used in fluidic systems over a wider range of fluid pressures than previous solenoid valves which do not include the double seal structure. Further, when the flared end 166 of the valve portion 126 is initially displaced from the sealing member 164 when the solenoid 140 is de-energized, the diametrically opposed passages 174 permit an initial flow of fluid through a central opening 178 in the sealing member 164 which begins the equalization of pressures above and below the sealing member 164. Accordingly, the sealing member 164 is readily displaced from the valve seat 130.

One system where a valve assembled in accordance with the present invention is highly beneficial is in a bypass line in a heater core of an automotive heating-/cooling system. In such a system, water and ethylene glycol (anti-freeze) are passed through the valve at a temperature range of −40° F. to 240° F., a pressure in the range of 5 psi to 20 psi and a flow rate of 5.1 GMP at a 20 psi pressure drop across the valve. During the normal life of the valve, the valve would operate at 4 cycles per minute with a 600,000 cycle life expectancy. With respect to the particular solenoid actuator, in the system described above, a normal operating voltage would be in the range of 12.6 volts to 14.6 volts with a maximum current draw of 3.0 amps. It should be noted, however, that the valve in accordance with the present invention may be applied in numerous fluidic control systems handling a wide range of pressures and flow rates with various operating cycles. Further, the solenoid actuator may be designed in any suitable manner such as a wide range of operating voltages including AC power sources.

In light of the foregoing, it is clear that a system employing a solenoid valve in accordance with the present invention would provide for the fail open safe operation of the system. Moreover, by utilizing a solenoid actuated valve in accordance with the preferred embodiment of the present invention would allow the system to accommodate pressures greater than those previously permitted without resorting to a more expensive compression spring and solenoid.

While the present invention has been described with reference to a preferred embodiment, it would be appreciated by those skilled in the art that the invention may be practiced otherwise than as specifically described herein without departing from the spirit and scope of the invention. It is, therefore, to be understood that the spirit and scope of the invention be limited only by the appended claims.

What is claimed is:

1. A valve comprising:
   a body having an internal chamber including an inlet section and an outlet section, a valve seat defining a valve port between said inlet section and said outlet section of said internal chamber;
   a valve spool extending through the valve port of said internal chamber and reciprocally received therein, said valve spool having a stem slidably received in a central bore of said body and a sealing means for sealing off fluid communication between said inlet section and said outlet section;
   a displacement means for displacing said valve stem toward said valve seat;
   biasing means for biasing said valve spool such that the sealing means of said valve spool is urged away from said valve seat and;
   a dislodging means for contacting said sealing means when said valve stem is displaced away from said valve seat.

2. The valve as defined in claim 1, wherein the valve seat of said body comprises a chamfered surface.

3. The valve as defined in claim 1 wherein said sealing means of said spool includes:
   a rod having first and second ends with said first end being secured to said stem;
   a retainer secured to the second end of said rod, said retainer including a first sealing surface;
   a seal member concentrically located on said rod adjacent said retainer, said seal member being longitudinally moveable along said rod and including an inner valve seat for cooperating with said first sealing surface and a second sealing surface for cooperating with said valve seat;
   wherein said first sealing surface contacts said inner valve seat and said second sealing surface contacts said valve seat when said valve spool is moved from an open position to a sealing position to seal off fluid communication between said inlet section and said outlet section.

4. The valve as defined in claim 3, wherein said dislodging means is sectored to said rod adjacent said sealing member such that when said valve spool is moved from said sealing position to said open position, said dislodging means contacts said sealing member after movement of said valve stem is commenced.

5. The valve as defined in claim 3, wherein said sealing member includes at least one flow passage therein, with said flow passage being sealed when said retainer is in a sealing position and opened when movement of said valve stem is commenced.

6. The valve as defined in claim 5, wherein said sealing member includes diametrically opposed flow passages.

7. The valve as defined in claim 1, wherein said means for biasing said valve spool is a compression spring.

8. The valve member as defined in claim 2, wherein the valve is a solenoid actuated valve and said displacement means includes an electrical coil encircling said bore in said body such that the sealing means of said valve spool is urged toward said valve seat in response to an electrical voltage being applied to said electrical coil.

9. The valve as defined in claim 8, wherein said sealing means of said valve spool includes a sealing surface and said sealing surface is chamfered so as to mate with the chamfered surface of the valve seat when said valve spool is moved from an open position to a sealing position.

10. A valve comprising:

a body having an internal chamber, said internal chamber including an inlet section and an outlet section;

a valve seat formed in said internal chamber defining a valve port between said inlet section and said outlet section of said internal chamber;

a valve spool extending through said valve port of said internal chamber, said valve spool having a stem slidably received in a central bore formed in said body, said valve spool including:

a rod having first and second ends with said first end being secured to said stem;

a retainer secured to the second end of said rod, said retainer including a first sealing surface;

a sealing member concentrically positioned on said rod adjacent said retainer, said sealing member being longitudinally moveable along said rod and including an inner valve seat for cooperating with said first sealing surface and a second sealing surface for cooperating with said valve seat;

a displacement means for displacing said valve spool toward said valve seat and urging said sealing member into contact with said valve seat;

biasing means for biasing said valve spool in a direction away from said valve seat; and a dislodging means for contacting said sealing member when movement of said valve stem is commenced;

wherein said first sealing surface contacts said inner valve seat and said second sealing surface contacts said valve seat when said valve spool is displaced by said displacement means to seal off fluid communication between said inlet section and said outlet section.

11. The valve as defined in claim 10, wherein said dislodging means is secured to said rod adjacent said sealing member such that when said stem is moved from a sealing position to an open position, said dislodging means contacts said sealing member after movement of said valve stem is commenced.

12. The valve as defined in claim 10, wherein said sealing member includes at least one flow passage therein, with said flow passage being sealed when said retainer is in a sealing position and opened when movement of said valve stem is commenced.

13. The valve as defined in claim 12, wherein said sealing member includes diametrically opposed flow passages.

14. The valve as defined in claim 9, wherein said means for biasing said valve spool is a compression spring.

15. The valve as defined in claim 10, wherein said displacement means is an electromagnetic solenoid.

16. In a sealing, a sealing member for selectively interrupting a flow of fluid from an inlet section to an outlet section of the valve, the valve member comprising:

an elongated valve stem having a first end and a second end; and a sealing section, said sealing section including;

a rod having a first end thereof secured to said valve stem and a second end;

a retainer secured to said second end of said rod, said retainer including a sealing surface;

a sealing means concentrically positioned on said rod adjacent said retainer, said sealing means including an inner valve seat for sealingly cooperating with said sealing surface and an external sealing surface for sealingly cooperating with a housing of the valve; and a dislodging means for contacting said sealing means when the flow of fluid from the inlet section to the outlet section is commenced;

wherein said sealing surface contacts said inner valve seat and said external sealing surface contacts the housing of the valve when the flow of fluid frown the inlet section to the outlet section is selectively interrupted.

17. The valve member as defined in claim 16, wherein said dislodging means is secured to said rod adjacent said sealing section such that when said stem is moved from a sealing position to an open position, said dislodging means contacts said sealing means after movement of said valve stem is commenced.

18. The valve member as defined in claim 17, wherein said sealing means includes at least one flow passage therein, with said flow passage being sealed when said retainer is in a sealing position and opened when movement of said valve stem is commenced.

19. The valve member as defined in claim 18, wherein said sealing member includes diametrically opposed flow passages.

* * * * *